United States Patent
Iwaya et al.

(10) Patent No.: US 9,926,405 B2
(45) Date of Patent: Mar. 27, 2018

(54) RESIN COMPOSITION

(71) Applicant: NAMICS CORPORATION, Niigata (JP)

(72) Inventors: Kazuki Iwaya, Niigata (JP); Fuminori Arai, Niigata (JP)

(73) Assignee: NAMICS CORPORATION, Niigata (JP)

( * ) Notice: Subject to any disclaimer, the term of this patent is extended or adjusted under 35 U.S.C. 154(b) by 0 days.

(21) Appl. No.: 15/125,433

(22) PCT Filed: Feb. 16, 2015

(86) PCT No.: PCT/JP2015/054164
§ 371 (c)(1),
(2) Date: Sep. 12, 2016

(87) PCT Pub. No.: WO2015/141347
PCT Pub. Date: Sep. 24, 2015

(65) Prior Publication Data
US 2017/0073459 A1    Mar. 16, 2017

(30) Foreign Application Priority Data

Mar. 17, 2014 (JP) .................. 2014-053719

(51) Int. Cl.
| | |
|---|---|
| C08L 63/02 | (2006.01) |
| C08K 5/37 | (2006.01) |
| C08G 59/66 | (2006.01) |
| C09J 163/00 | (2006.01) |
| C08L 63/00 | (2006.01) |
| C08G 59/56 | (2006.01) |
| C08K 3/22 | (2006.01) |
| C08K 3/36 | (2006.01) |
| C08K 5/06 | (2006.01) |
| C08K 5/3462 | (2006.01) |
| C08K 5/5435 | (2006.01) |
| C08K 5/55 | (2006.01) |
| C08K 5/00 | (2006.01) |

(52) U.S. Cl.
CPC ............ *C08G 59/66* (2013.01); *C08G 59/56* (2013.01); *C08K 3/22* (2013.01); *C08K 3/36* (2013.01); *C08K 5/005* (2013.01); *C08K 5/06* (2013.01); *C08K 5/3462* (2013.01); *C08K 5/37* (2013.01); *C08K 5/5435* (2013.01); *C08K 5/55* (2013.01); *C08L 63/00* (2013.01); *C09J 163/00* (2013.01); *C08K 2003/2227* (2013.01); *C09J 2203/326* (2013.01)

(58) Field of Classification Search
CPC ........... C08L 63/00; C08K 5/378; C08K 5/37; C08K 5/5419
See application file for complete search history.

(56) References Cited

U.S. PATENT DOCUMENTS

| | | | |
|---|---|---|---|
| 7,479,534 B2* | 1/2009 | Amano | .................. C08G 59/18 528/109 |
| 2002/0010287 A1 | 1/2002 | Hinoma | |
| 2013/0165600 A1 | 6/2013 | Chen | |
| 2013/0203895 A1* | 8/2013 | Dershem | ................ C08G 59/44 523/400 |
| 2014/0186593 A1 | 7/2014 | Cho | |
| 2015/0175856 A1* | 6/2015 | Ishikawa | .................. C08K 3/36 257/778 |

(Continued)

FOREIGN PATENT DOCUMENTS

| | | |
|---|---|---|
| JP | 6211969 A2 | 8/1994 |
| JP | 6211970 A2 | 8/1994 |
| JP | 8127635 A2 | 5/1996 |

(Continued)

OTHER PUBLICATIONS

US 6,221,980, 04/2001, Hinoma (withdrawn)

(Continued)

*Primary Examiner* — Brieann R Johnston
(74) *Attorney, Agent, or Firm* — Rankin, Hill & Clark LLP

(57) ABSTRACT

A resin composition containing (A) an epoxy resin; (B) a compound represented by formula (1) below; (C) a curing accelerator; and (D) a silane coupling agent is provided. The compound of the (B) component has a content of 1:0.5 to 1:2.5, in terms of an equivalent ratio between epoxy groups in the epoxy resin of the (A) component and thiol groups in the compound of the (B) component, the silane coupling agent of the (D) component has a content of 0.2 parts by mass to 50 parts by mass with respect to 100 parts by mass in total of the (A) component, the (B) component, the (C) component, and the (D) component, and an equivalent ratio between thiol groups in the compound of the (B) component and Si in the silane coupling agent of the (D) component is 1:0.002 to 1:1.

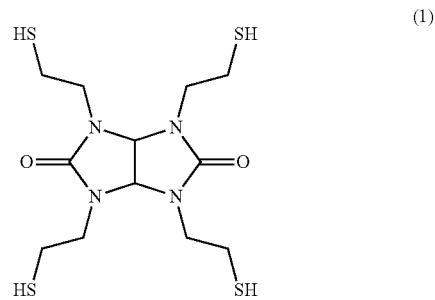

(1)

20 Claims, No Drawings

(56) References Cited

U.S. PATENT DOCUMENTS

2016/0289237 A1* 10/2016 Kumano ............... C07D 487/04

FOREIGN PATENT DOCUMENTS

| | | |
|---|---|---|
| JP | 2000080153 A2 | 3/2000 |
| JP | 2001187859 A2 | 7/2001 |
| JP | 2011064869 A2 | 3/2011 |
| JP | 2013543012 T2 | 11/2013 |
| JP | 2014009233 A2 | 1/2014 |
| JP | 2014065808 A2 | 4/2014 |
| JP | 2014129526 A2 | 7/2014 |
| JP | 2015059099 A2 | 3/2015 |

OTHER PUBLICATIONS

ShinEtsu (Epoxy Functional Silane Coupling Agents Product Information. ShinEtsu. 2017, 1 page).*
Dow (Product Safety Assessment Trimethyl Borate. Dow. Jul. 30, 2014, 5 pages).*
International Search Report dated May 19, 2015 filed in PCT/JP2015/054164.

* cited by examiner

RESIN COMPOSITION

TECHNICAL FIELD

The present invention relates to a resin composition that is suitable as a one-component adhesive in an application where thermal curing at a relatively low temperature, specifically thermal curing at approximately 80° C., is required. The resin composition according to the present invention is suitable as a one-component adhesive to be used during manufacture of image sensor modules used as camera modules for cellular phones or smart phones, or during manufacture of electronic components such as semiconductor elements, integrated circuits, large-scale integrated circuits, transistors, thyristors, diodes, and condensers. Furthermore, the resin composition according to the present invention is expected to have a use as a liquid sealing material used during manufacture of semiconductor devices.

BACKGROUND ART

When manufacturing image sensor modules used as camera modules for cellular phones or smart phones, there is used a one-component adhesive that is thermally cured at a relatively low temperature, specifically at a temperature of approximately 80° C. When manufacturing electronic components such as semiconductor elements, integrated circuits, large-scale integrated circuits, transistors, thyristors, diodes, and condensers, there is also preferably used a one-component adhesive that is thermally cured at a temperature of approximately 80° C. As a one-component adhesive that meets these requirements and can be cured at low temperature, there is known a thiol-based adhesive containing, as essential components, an epoxy resin, a polythiol compound, and a curing accelerator (for example, see Patent Literatures 1 and 2).

Furthermore, the one-component adhesive to be used during manufacture of image sensor modules or electronic components is also required to have moisture resistance. Thus, such a one-component adhesive is required to be also excellent in PCT (pressure cooker test) tolerance. A known thiol-based adhesive can be cured at a temperature of approximately 80° C. However, it was found that the PCT tolerance is not sufficient.

CITATION LIST

Patent Literature

PATENT LITERATURE 1: JP-A-6-211969
PATENT LITERATURE 2: JP-A-6-211970

SUMMARY OF THE INVENTION

Problems to be Solved by the Invention

An objective of the present invention is to provide a resin composition that can be thermally cured at a temperature of approximately 80° C. and is also excellent in PCT tolerance, so that the above-described problems of a known art are solved. That is, an objective of the present invention is to provide a resin composition that is accordingly suitable as a one-component adhesive to be used during manufacture of image sensor modules or electronic components.

Solution to the Problems

For achieving the above-described objective, the present invention provides a resin composition characterized by the following. A resin composition contains: (A) an epoxy resin; (B) a compound represented by formula (1) below; (C) a curing accelerator; and (D) a silane coupling agent.

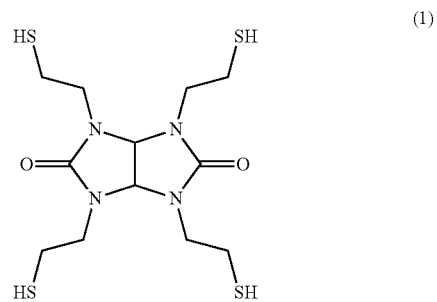 [SMILES: O=C1N(CCS)C2C(N1CCS)N(CCS)C(=O)N2CCS]

A content of the compound of the (B) component is 1:0.5 to 1:2.5, in terms of an equivalent ratio between epoxy groups in the epoxy resin of the (A) component and thiol groups in the compound of the (B) component. A content of the silane coupling agent of the (D) component is 0.2 parts by mass to 50 parts by mass with respect to 100 parts by mass of the (A) component, the (B) component, the (C) component, and the (D) component in total. An equivalent ratio between thiol groups in the compound of the (B) component and Si in the silane coupling agent of the (D) component is 1:0.002 to 1:1.

The resin composition according to the present invention may further contain (E) a stabilizer. The stabilizer of the (E) component is at least one selected from the group consisting of liquid boric acid ester compounds, aluminum chelate, and barbituric acids.

In the resin composition according to the present invention, the silane coupling agent of the (D) component is preferably at least one selected from the group consisting of 3-glycidoxypropyltrimethoxysilane, 2-(3,4-epoxycyclohexyl)ethyltrimethoxysilane, 3-methacryloxypropyltrimethoxysilane, and 8-glycidoxyoctyltrimethoxysilane.

In the resin composition according to the present invention, the curing accelerator of the (C) component is preferably an imidazole-based curing accelerator, a tertiary amine-based curing accelerator, or a phosphorus compound-based curing accelerator.

Also, the present invention provides a one-component adhesive containing the resin composition according to the present invention.

Also, the present invention provides a cured resin obtained by heating a resin composition.

Also, the present invention provides an image sensor module manufactured with the one-component adhesive according to the present invention.

Also, the present invention provides an electronic component manufactured with the one-component adhesive according to the present invention.

Effects of the Invention

The resin composition according to the present invention can be thermally cured at a temperature of approximately 80° C., and is also excellent in PCT tolerance. Accordingly, the resin composition is suitable as a one-component adhesive to be used during manufacture of image sensor modules or electronic components.

DESCRIPTION OF THE EMBODIMENTS

Hereinafter, the resin composition according to the present invention will be described in detail. The resin composition according to the present invention includes the following (A) to (D) components as essential components.

(A) Component: Epoxy Resin

The epoxy resin of the (A) component is an component that becomes the base compound of the resin composition according to the present invention.

The epoxy resin of the (A) component may be any epoxy resin that has two or more epoxy groups per molecule. Examples of the epoxy resin of the (A) component may include polyhydric phenol such as bisphenol A, bisphenol F, bisphenol AD, catechol and resorcinol, polyglycidyl ether obtained by reaction between polyhydric alcohol such as glycerin or polyethylene glycol and epichlorhydrin, glycidyl ether ester obtained by reaction between a hydroxycarboxylic acid such as a p-hydroxybenzoic acid or a β-hydroxynaphthoic acid and epichlorhydrin, polyglycidyl ester obtained by reaction between a polycarboxylic acid such as a phthalic acid or a terephthalic acid and epichlorhydrin, and an epoxy resin having a naphthalene backbone such as 1,6-bis(2,3-epoxypropoxy)naphthalene. Further examples may include an epoxidized phenolic novolac resin, an epoxidized cresol novolac resin, epoxidized polyolefin, a cyclic aliphatic epoxy resin, a urethane modified epoxy resin, and a silicone modified epoxy resin. However, the (A) component is not limited to these examples.

(B) Component: Compound Represented by Formula (1) Below

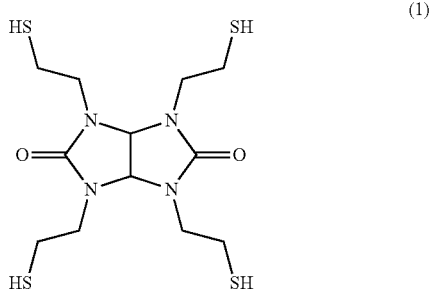 [SMILES: O=C1N(CCS)C2C(N1CCS)N(CCS)C(=O)N2CCS]

(1)

The compound of the (B) component has four thiol groups in the compound. The (B) component acts as a curing agent for the epoxy resin of the (A) component. Known thiol-based adhesives, such as adhesives disclosed in Patent Literatures 1 and 2, contain, as a curing agent for the epoxy resin, a polythiol compound such as pentaerythritol tetrakis (3-mercaptopropionate) (trade name "PEMP" manufactured by SC Organic Chemical Co., Ltd.), trimethylolpropane tris(3-mercaptopropionate) (trade name "TMMP" manufactured by SC Organic Chemical Co., Ltd.), tris-[(3-mercaptopropionyloxy)-ethyl]-isocyanurate (trade name "TEMPIC" manufactured by SC Organic Chemical Co., Ltd.), dipentaerythritol hexakis(3-mercaptopropionate) (trade name "DPMP" manufactured by SC Organic Chemical Co., Ltd.), and tetraethylene glycolbis(3-mercaptopropionate) (trade name "EGMP-4" manufactured by SC Organic Chemical Co., Ltd.). However, all of these polythiol compounds have an ester bond. Under a high-temperature high-humidity environment such as in the PCT, the ester bond is hydrolyzed, causing decrease in adhesive strength. It is considered that this causes known thiol-based adhesives to have insufficient PCT tolerance.

In contrast to this, the compound of the formula (1) does not have an ester bond. Therefore, this compound is not hydrolyzed under a high-temperature and high-humidity environment such as in the PCT. Therefore, the adhesive strength is unlikely to be decreased. Thus, the PCT tolerance improves.

In the resin composition according to the present invention, the content of the compound of the (B) component is 0.5 equivalent to 2.5 equivalent in terms of a thiol equivalent ratio of the compound of the (B) component with respect to the epoxy equivalent of the (A) component (the epoxy resin). When the content of the compound of the (B) component as a curing agent for the epoxy resin of the (A) component is lower than the lower limit (0.5 equivalent), the adhesive strength of the resin composition markedly decreases.

When the content of the compound of the (B) component is higher than the upper limit (2.5 equivalent), the amount of the compound of the (B) component, which does not contribute to a curing reaction, increases (in terms of a thiol equivalent ratio). Therefore, the PCT tolerance of the resin composition decreases.

The content of the compound of the (B) component is more preferably 0.6 equivalent to 2.3 equivalent in terms of a thiol equivalent ratio of the compound of the (B) component with respect to the epoxy equivalent of the (A) component (the epoxy resin).

(C) Component: Curing Accelerator

The curing accelerator of the (C) component is not particularly limited, as long as it is a curing accelerator for the epoxy resin of the (A) component. As the (C) component, a known curing accelerator can be used. Examples of the (C) component may include an imidazole-based curing accelerator (including microcapsule type, epoxy adduct type, and inclusion type) made of an imidazole compound, a tertiary amine-based curing accelerator, and a phosphorus compound-based curing accelerator.

Among these, an imidazole-based curing accelerator and a tertiary amine-based curing accelerator have high resin composition curing speed. Therefore, thermal curing at 80° C. is performed preferably with these curing accelerators, and particularly preferably with an imidazole-based curing accelerator.

Specific examples of the imidazole-based curing accelerator may include imidazole compounds such as 2-methylimidazole, 2-undecylimidazole, 2-heptadecylimidazole, 2-ethyl-4-methylimidazole, 2-phenylimidazole, and 2-phenyl-4-methylimidazole. Alternatively, an imidazole compound enclosed with an inclusion compound such as 1,1,2,2-tetrakis-(4-hydroxyphenyl)ethane or 5-hydroxyisophthalic acid may be used.

Furthermore, encapsulated imidazole called microcapsule-type imidazole or epoxy adduct-type imidazole can also be used. That is, an imidazole-based latent curing agent encapsulated by adducting an imidazole compound with urea or an isocyanate compound and then blocking the surface of the obtained product with an isocyanate compound can be used. Alternatively, an imidazole-based latent curing agent encapsulated by adducting an imidazole compound with an epoxy compound and then blocking the surface of the obtained product with an isocyanate compound can also be used. Specific examples may include Novacure HX3941HP, Novacure HXA3942HP, Novacure HXA3922HP, Novacure HXA3792, Novacure HX3748, Novacure HX3721, Novacure HX3722, Novacure HX3088, Novacure HX3741, Novacure HX3742, Novacure HX3613 (all manufactured by Asahi Kasei Chemicals Corporation, trade name), and the like, Amicure PN-23J, Amicure PN-40J, and Amicure PN-50 (manufactured by Ajinomoto Fine-Techno Co., Inc., trade name), and Fujicure FXR-1121 (manufactured by Fuji Kasei Kogyo Co., Ltd., trade name).

Specific examples of the tertiary amine-based curing accelerator may include Fujicure FXR-1020, Fujicure FXR-1030 (manufactured by Fuji Kasei Kogyo Co., Ltd., trade name), and Amicure MY-24 (manufactured by Ajinomoto Fine-Techno Co., Inc., trade name).

A suitable range for the content of the curing accelerator of the (C) component depends on the type of the curing accelerator. In the case of the imidazole-based curing accelerator, the content with respect to 100 parts by mass of the epoxy resin as the (A) component is preferably 0.3 to 40 parts by mass, more preferably 0.5 to 20 parts by mass, and further preferably 1.0 to 15 parts by mass.

In the case of the tertiary amine-based curing accelerator, the content with respect to 100 parts by mass of the epoxy resin as the (A) component is preferably 0.3 to 40 parts by mass, more preferably 0.5 to 20 parts by mass, and further preferably 1.0 to 15 parts by mass.

(D): Silane Coupling Agent

In the resin composition according to the present invention, the silane coupling agent of the (D) component contributes to improvement in PCT tolerance of the resin composition. As will be indicated in the later-described examples, the inclusion of the silane coupling agent in a certain amount as the (D) component improves the PCT tolerance of the resin composition. On the other hand, when the silane coupling agent is not included, or when a titanium coupling agent is included instead of the silane coupling agent, the PCT tolerance of the resin composition does not improve. The reason why the PCT tolerance of the resin composition improves when the silane coupling agent is included in a certain amount is not clear. However, it is inferred that improvement in cohesive strength between an adherend and a cured product of the resin composition has improved the PCT tolerance.

Examples of a usable silane coupling agent of the (D) component may include various silane coupling agents based on epoxy, amino, vinyl, methacryl, acryl, and mercapto. Specific examples of the silane coupling agent may include 3-glycidoxypropyltrimethoxysilane, 2-(3,4-epoxycyclohexyl)ethyltrimethoxysilane, 3-methacryloxypropyltrimethoxysilane, and 8-glycidoxyoctyltrimethoxysilane. Among these, 3-glycidoxypropyltrimethoxysilane is preferable from the viewpoint of the effect of improving adhesive strength.

In the resin composition according to the present invention, the content of the silane coupling agent of the (D) component with respect to 100 parts by mass in total of the (A) component, the (B) component, the (C) component, and the (D) component is 0.2 parts by mass to 50 parts by mass. When the content of the silane coupling agent of the (D) component is less than 0.2 parts by mass, the PCT tolerance of the resin composition does not improve. On the other hand, when the content of the silane coupling agent of the (D) component is more than 50 parts by mass, the adhesive strength decreases.

It is noted that in the case of a known thiol-based adhesive containing an epoxy resin as a base compound, an excessive content of the silane coupling agent causes the PCT tolerance to decrease. Therefore, the content of the silane coupling agent has been defined to be 1 part by mass or less with respect to 100 parts by mass in total of the main components of the adhesive. In contrast to this, in the resin composition according to the present invention, as will be indicated in the later-described examples, the content of the silane coupling agent of the (D) component can be defined 1 part by mass or more with respect to 100 parts by mass in total of the (A) component to the (D) component. This still has not reduced the PCT tolerance, and has rather improved the PCT tolerance. However, attention needs to be paid to the fact that when the content of the silane coupling agent of the (D) component is defined to be high, the volatilization amount during thermal curing increases. The increase in the volatilization amount during thermal curing may lead to generation of air bubbles, thereby reducing adhesive strength. Therefore, when the content of the silane coupling agent of the (D) component is defined to be high, countermeasures such as performing thermal curing in an environment equipped with a forced exhaust facility or performing thermal curing under a reduced pressure environment need to be taken in order to reduce the influence by the volatile matter.

The content of the silane coupling agent of the (D) component is preferably 0.5 to 30 parts by mass.

In the resin composition according to the present invention, the content of the silane coupling agent of the (D) component is 1:0.002 to 1:1 in terms of an equivalent ratio between thiol groups in the compound of the (B) component and Si in the silane coupling agent of the (D) component. When the content of the silane coupling agent of the (D) component is less than 1:0.002, the PCT tolerance of the resin composition does not improve. On the other hand, when the content of the silane coupling agent of the (D) component is more than 1:1, the adhesive strength decreases. The content of the silane coupling agent of the (D) component is preferably 1:0.002 to 1:0.4 in terms of an equivalent ratio between thiol groups in the compound of the (B) component and Si in the silane coupling agent of the (D) component.

The resin composition according to the present invention may include the below-described components as necessary, other than the above-described (A) to (D) components.

(E) Component: Stabilizer

The resin composition according to the present invention may include a stabilizer as an (E) component in order to improve storage stability at normal temperature (25° C.) and extend pot life.

As the stabilizer of the (E) component, at least one selected from the group consisting of a liquid boric acid ester compound, aluminum chelate, and a barbituric acid is preferable, because the effect of improving storage stability at normal temperature (25° C.) is high.

Examples of a usable liquid boric acid ester compound may include 2,2'-oxybis(5,5'-dimethyl-1,3,2-oxaborinane), trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate, and triethanolamine borate.

It is noted that the liquid boric acid ester compound included as the (E) component is liquid at normal temperature (25° C.). Therefore, the liquid boric acid ester compound is a preferable stabilizer, because the viscosity of the formulations can be suppressed to be low.

When the liquid boric acid ester compound is included as the (E) component, the content of the liquid boric acid ester compound with respect to 100 parts by mass in total of the (A) component to the (E) component is preferably 0.1 to 8.9 parts by mass, more preferably 0.1 to 4.4 parts by mass, and further preferably 0.1 to 3.5 parts by mass.

An example of usable aluminum chelate includes aluminum chelate A.

When aluminum chelate is included as the (E) component, the content of the aluminum chelate with respect to 100 parts by mass in total of the (A) component to the (E) component is preferably 0.1 to 14.0 parts by mass, more preferably 0.1 to 13.0 parts by mass, and further preferably 0.1 to 12.0 parts by mass.

When the barbituric acid is included as the (E) component, the content of the barbituric acid with respect to 100 parts by mass in total of the (A) component to the (E) component is preferably 0.1 to 8.9 parts by mass, more preferably 0.1 to 7.1 parts by mass, and further preferably 0.1 to 4.0 parts by mass.

(F) Component: Filler

When the resin composition according to the present invention is used as a one-component adhesive, a filler is preferably included as an (F) component. When the resin composition according to the present invention is used as a one-component adhesive, the inclusion of a filler as the (F) component improves moisture resistance and thermal cycle resistance, especially thermal cycle resistance, of an adhered site. The improvement of thermal cycle resistance by the use of a filler is attributable to the decrease in linear expansion coefficients, which suppresses expansion and contraction of a cured resin caused by a thermal cycle.

The filler as the (F) component is not particularly limited, as long as it has the effect of decreasing linear expansion coefficients when added. Various fillers can be used. Specific examples may include a silica filler and an alumina filler. Among these, a silica filler is preferable, because it can be filled in a large amount.

It is noted that the filler as the (F) component may be subjected to a surface treatment with a silane coupling agent or the like. When the filler having been subjected to a surface treatment is used, the effect of preventing aggregation of the filler can be expected. Accordingly, the preservation stability of the resin composition according to the present invention is expected to improve.

The average particle size of the filler as the (F) component is preferably 0.007 to 10 μm, and more preferably 0.1 to 6 μm.

Here, the shape of the filler is not particularly limited. The form of the filler may be any of spherical, indefinite, scaly, and the like. It is noted that when the shape of the filler is other than spherical, the average particle size of the filler means the average maximum diameter of the filler.

When the filler as the (F) component is included, the content of the filler in the resin composition according to the present invention, with respect to 100 parts by mass in total of the (A) component to the (D) component (when the resin composition according to the present invention includes the stabilizer of the (E) component, with respect to 100 parts by mass in total of the (A) component to the (E) component), is preferably 5 to 400 parts by mass, more preferably 5 to 200 parts by mass, and further preferably 5 to 120 parts by mass.

(Other Formulating Agents)

The resin composition according to the present invention may include components other than the above-described (A) to (F) components as necessary. Specific examples of such components to be formulated may include an ion trapping agent, a leveling agent, an antioxidant, an antifoaming agent, a flame retardant, and a coloring agent. The type and formulating amount of each formulating agent can be determined according to a method known in the art.

The resin composition according to the present invention is prepared by stirring a mixture of the above-described (A) to (D) components, the (E) component and the (F) component (when these components are included), and other formulating agents formulated as necessary, with a Henschel mixer or the like.

When the resin composition according to the present invention is used as a one-component adhesive, the one-component adhesive is applied onto a site to be adhered, and thermally cured at a temperature of approximately 80° C. The thermal curing time is preferably 10 to 180 minutes, and more preferably 30 to 60 minutes.

When the resin composition according to the present invention is used as a one-component adhesive, the following components may be formulated, in addition to the components of the resin composition (that is, the above-described (A) to (D) components, the above-described (E) component and (F) component (when these components are included), and the above-described other formulating agents to be formulated as necessary).

The one-component adhesive containing the resin composition according to the present invention is thermally cured at a temperature of approximately 80° C. Therefore, this one-component adhesive is suitable as a one-component adhesive to be used during manufacture of image sensor modules or electronic components.

Furthermore, the resin composition according to the present invention can also be used as a liquid sealing material to be used during manufacture of semiconductor devices.

The one-component adhesive obtained with the resin composition according to the present invention has sufficient adhesive strength. Specifically, the adhesive strength measured by a later-described procedure (shear strength, thermal curing at 80° C. for 60 min) is preferably 9 Kgf/chip or more, more preferably 10 Kgf/chip, and further preferably 15 Kgf/chip.

The one-component adhesive obtained with the resin composition according to the present invention is not hydrolyzed under a high-temperature and high-humidity environment such as in the PCT. Therefore, the adhesive strength is unlikely to be decreased. Accordingly, the PCT tolerance improves. Specifically, the persistence of the adhesive strength (shear strength, curing at 80° C. for 60 min) before and after the PCT (pressure cooker test) represented by the following formula is preferably 30% or more.

(Shear strength after PCT)/(shear strength before PCT)×100

EXAMPLES

Hereinafter, the present invention will be described in detail by examples. However, the present invention is not limited to these examples.

(Preparation of Resin Composition)

A resin composition was prepared by mixing each component according to a formulation illustrated in Tables 1 to 12. It is noted that in Tables 1 to 12, all of the numerals representing formulation ratios of the (A) component to (F) component indicate parts by mass.

Each component in Tables 1 to 10 is as follows.

(A) Component

EXA835LV: mixture of bisphenol F-type epoxy resin and bisphenol A-type epoxy resin (manufactured by DIC Corporation, epoxy equivalent: 165)

YDF8170: bisphenol F-type epoxy resin (manufactured by Nippon Steel Chemical Co., Ltd., epoxy equivalent: 160)

ZX1658GS: cyclohexanedimethanol diglicidyl ether (manufactured by Nippon Steel Chemical Co., Ltd., epoxy equivalent: 135)

(B) Component

TS-G: compound represented by formula (1) below (manufactured by Shikoku Chemicals Corporation, thiol group equivalent: 94)

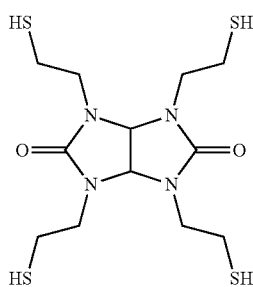

(1)

(B') Component

PEMP: pentaerythritol tetrakis(3-mercaptopropionate) (manufactured by SC Organic Chemical Co., Ltd., thiol group equivalent: 122)

(C) Component

HX3088: Novacure HX3088 (imidazole-based latent curing accelerator, manufactured by Asahi Kasei Chemicals Corporation, (⅓: imidazole adduct product, ⅔: epoxy resin), epoxy equivalent: 180)

HXA3922HP: Novacure HXA3922HP (imidazole-based latent curing accelerator, manufactured by Asahi Kasei Chemicals Corporation, (⅓: imidazole adduct product, ⅔: epoxy resin), epoxy equivalent: 180)

FXR1030: Fujicure FXR-1030 (imidazole-based latent curing accelerator, manufactured by Fuji Kasei Kogyo Co., Ltd.)

2P4MZ: 2-phenyl-4-methylimidazole (manufactured by Shikoku Chemicals Corporation)

(D) Component

KBM403: 3-glycidoxypropyltrimethoxysilane (silane coupling agent, manufactured by Shin-Etsu Chemical Co., Ltd., Si equivalent: 236.3)

KBM303: 2-(3,4-epoxycyclohexyl)ethyltrimethoxysilane (silane coupling agent, manufactured by Shin-Etsu Chemical Co., Ltd., Si equivalent: 246.4)

KBM503: 3-methacryloxypropyltrimethoxysilane (silane coupling agent, manufactured by Shin-Etsu Chemical Co., Ltd., Si equivalent: 248.4)

KBM4803: 8-glycidoxyoctyltrimethoxysilane (silane coupling agent, manufactured by Shin-Etsu Chemical Co., Ltd., Si equivalent: 306.3)

(D') Component

KR41B: titanium coupling agent, manufactured by Ajinomoto Fine-Techno Co., Inc.

KR46B: titanium coupling agent, manufactured by Ajinomoto Fine-Techno Co., Inc.

KR55: titanium coupling agent, manufactured by Ajinomoto Fine-Techno Co., Inc.

(E) Component

TIPB: triisopropyl borate (manufactured by Tokyo Chemical Industry Co., Ltd.)

ALA: aluminum chelate A (manufactured by Kawaken Fine Chemicals Co., Ltd.)

Barbituric acid (manufactured by Tokyo Chemical Industry Co., Ltd.)

(F) Component

SOE5: silica filler (manufactured by Admatechs Company Limited)

AO809: alumina filler (manufactured by Admatechs Company Limited)

The adhesive strength (shear strength) of the prepared resin composition was measured by the following procedure. The result is illustrated in the following tables.

(1) Print a sample through a stencil on a glass epoxy substrate with a size of 2 mmf.

(2) Place a 2 mm×2 mm Si chip on the printed sample. Thermally cure this using a blast dryer at 80° C. for 60 minutes.

(3) Measure a shear strength using a tabletop universal tester (1605HTP manufactured by Aikoh Engineering Co., Ltd.).

Also, a sample prepared by the same procedure as the above was thermally cured at 120° C. for 60 minutes. Thereafter, the shear strength of the sample was measured using a tabletop-type strength measuring machine. Furthermore, the shear strength of the sample which has been left to stand in a PCT (a tank at 121° C./humidity 100%/2 atm) for 10 hours or 20 hours was measured using a tabletop-type strength measuring machine. Furthermore, the persistence of the shear strength before and after the PCT was calculated according to the following formula. The result is illustrated in the following tables.

(Shear strength after PCT)/(shear strength before PCT)×100

TABLE 1

|  |  | Example 1-1 | Example 1-2 | Example 1-3 | Example 1-4 | Example 1-5 |
|---|---|---|---|---|---|---|
| (A) component | EXA835LV | 69.6 | 61.5 | 56.6 | 46.5 | 39.5 |
|  | YDF8170 | — | — | — | — | — |
|  | ZX1658GS | — | — | — | — | — |
| (B) component | TS-G | 24.8 | 33.0 | 37.8 | 48.0 | 55.0 |
| (B') component | PEMP | — | — | — | — | — |
| (C) component | HX3088 | 5.0 | 4.9 | 5.0 | 4.9 | 4.9 |
|  | HXA3922HP | — | — | — | — | — |
|  | FXR1030 | — | — | — | — | — |
|  | 2P4MZ | — | — | — | — | — |
| (D) component | KBM403 | 0.5 | 0.5 | 0.5 | 0.5 | 0.5 |
|  | KBM303 | — | — | — | — | — |
|  | KBM503 | — | — | — | — | — |
|  | KBM4803 | — | — | — | — | — |
| (D') component | KR41B | — | — | — | — | — |
|  | KR46B | — | — | — | — | — |
|  | KR55 | — | — | — | — | — |

TABLE 1-continued

|  |  | Example 1-1 | Example 1-2 | Example 1-3 | Example 1-4 | Example 1-5 |
|---|---|---|---|---|---|---|
| (E) component | TPB | — | — | — | — | — |
|  | ALA | — | — | — | — | — |
|  | Barbituric acid | — | — | — | — | — |
| (F) component | SOE5 | — | — | — | — | — |
|  | AO 809 | — | — | — | — | — |
| Total |  | 100 | 100 | 100 | 100 | 100 |
| Epoxy functional amount ((A) component) |  | 0.44 | 0.39 | 0.36 | 0.30 | 0.26 |
| Thiol functional amount ((B) component) |  | 0.26 | 0.35 | 0.40 | 0.51 | 0.59 |
| Thiol/epoxy equivalent ratio |  | 0.6 | 0.9 | 1.1 | 1.7 | 2.3 |
| Si functional group amount ((D) component) |  | 0.002 | 0.002 | 0.002 | 0.002 | 0.002 |
| Si/thiol equivalent ratio |  | 0.008 | 0.006 | 0.005 | 0.004 | 0.004 |
| (C) component/(A) component equivalent ratio (parts by mass/100 parts by mass) |  | 2.3 | 2.5 | 2.8 | 3.3 | 3.8 |
| (E) component/(A) component equivalent ratio (parts by mass/100 parts by mass) |  | — | — | — | — | — |
| Evaluation of shear strength after PCT test [kgf/chip] |  |  |  |  |  |  |
| Curing at 80° C. for 1 hr | 0 | 15.9 | 25.6 | 24.5 | 28.1 | 29.0 |
| PCT time [hours] | 10 | 10.0 | 16.1 | 13.2 | 14.9 | 14.1 |
|  | 20 | 9.9 | 15.1 | 12.4 | 15.6 | 17.2 |
| Persistence of shear strength | PCT 10 hours | 62.9 | 63.0 | 53.9 | 52.9 | 48.8 |
| (%) | PCT 20 hours | 62.3 | 58.9 | 50.4 | 55.5 | 59.5 |
| Curing at 120° C. for 1 hr | 0 | 26.4 | 31.3 | 27.3 | 26.0 | 27.6 |
| PCT time [hours] | 10 | 16.6 | 19.5 | 14.6 | 13.8 | 14.1 |
|  | 20 | 15.7 | 18.0 | 13.2 | 15.0 | 15.9 |
| Persistence of shear strength | PCT 10 hours | 62.8 | 62.2 | 53.6 | 53.0 | 51.2 |
| (%) | PCT 20 hours | 59.7 | 57.5 | 48.4 | 57.5 | 57.8 |

TABLE 2

|  |  | Example 1-6 | Example 1-7 | Example 1-8 | Example 1-9 | Example 1-10 |
|---|---|---|---|---|---|---|
| (A) component | EXA835LV | 48.2 | 37.2 | 23.7 | — | — |
|  | YDF8170 | — | — | — | 56.0 | — |
|  | ZX1658GS | — | — | — | — | 52.2 |
| (B) component | TS-G | 32.2 | 38.4 | 33.0 | 38.5 | 42.3 |
| (B') component | PEMP | — | — | — | — | — |
| (C) component | HX3088 | 19.2 | 23.9 | 43.0 | 5.0 | 5.0 |
|  | HXA3922HP | — | — | — | — | — |
|  | FXR1030 | — | — | — | — | — |
|  | 2P4MZ | — | — | — | — | — |
| (D) component | KBM403 | 0.4 | 0.4 | 0.3 | 0.5 | 0.5 |
|  | KBM303 | — | — | — | — | — |
|  | KBM503 | — | — | — | — | — |
|  | KBM4803 | — | — | — | — | — |
| (D') component | KR41B | — | — | — | — | — |
|  | KR46B | — | — | — | — | — |
|  | KR55 | — | — | — | — | — |
| (E) component | TPB | — | — | — | — | — |
|  | ALA | — | — | — | — | — |
|  | Barbituric acid | — | — | — | — | — |
| (F) component | SOE5 | — | — | — | — | — |
|  | AO 809 | — | — | — | — | — |
| Total |  | 100 | 100 | 100 | 100 | 100 |
| Epoxy functional amount ((A) component) |  | 0.36 | 0.31 | 0.30 | 0.37 | 0.41 |
| Thiol functional amount ((B) component) |  | 0.34 | 0.41 | 0.35 | 0.41 | 0.45 |
| Thiol/epoxy equivalent ratio |  | 0.9 | 1.3 | 1.2 | 1.1 | 1.1 |
| Si functional group amount ((D) component) |  | 0.002 | 0.002 | 0.001 | 0.002 | 0.002 |
| Si/thiol equivalent ratio |  | 0.005 | 0.004 | 0.004 | 0.005 | 0.005 |
| (C) component/(A) component equivalent ratio (parts by mass/100 parts by mass) |  | 10.5 | 15.0 | 27.4 | 2.8 | 3.0 |
| (E) component/(A) component equivalent ratio (parts by mass/100 parts by mass) |  | — | — | — | — | — |
| Evaluation of shear strength after PCT test [kgf/chip] |  |  |  |  |  |  |
| Curing at 80° C. for 1 hr | 0 | 25.9 | 26.6 | 26.1 | 23.9 | 18.9 |
| PCT time [hours] | 10 | 16.1 | 16.1 | 16.6 | 12.3 | 12.1 |
|  | 20 | 14.6 | 14.5 | 15.1 | 10.9 | 9.8 |

TABLE 2-continued

|  |  | Example 1-6 | Example 1-7 | Example 1-8 | Example 1-9 | Example 1-10 |
|---|---|---|---|---|---|---|
| Persistence of shear strength (%) | PCT 10 hours | 62.1 | 60.6 | 63.6 | 51.5 | 64.0 |
|  | PCT 20 hours | 56.4 | 54.4 | 58.0 | 45.6 | 51.9 |
| Curing at 120° C. for 1 hr PCT time [hours] | 0 | 26.9 | 27.0 | 27.1 | 24.6 | 21.5 |
|  | 10 | 15.4 | 16.1 | 16.6 | 13.2 | 11.2 |
|  | 20 | 15.1 | 14.1 | 14.6 | 13.0 | 10.6 |
| Persistence of shear strength (%) | PCT 10 hours | 57.0 | 59.6 | 61.1 | 53.7 | 52.1 |
|  | PCT 20 hours | 55.9 | 52.1 | 53.6 | 52.8 | 49.3 |

TABLE 3

|  |  | Comparative Example 1-1 | Comparative Example 1-2 | Comparative Example 1-3 | Comparative Example 1-4 | Comparative Example 1-5 | Comparative Example 1-6 | Comparative Example 1-7 |
|---|---|---|---|---|---|---|---|---|
| (A) component | EXA835LV | 57.0 | 87.1 | 34.8 | 77.9 | 54.3 | 54.0 | 53.8 |
|  | YDF8170 | — | — | — | — | — | — | — |
|  | ZX1658GS | — | — | — | — | — | — | — |
| (B) component | TS-G | 38.0 | — | 59.6 | 12.4 | — | — | — |
| (B') component | PEMP | — | — | — | — | 40.6 | 40.5 | 40.3 |
| (C) component | HX3088 | 5.0 | 12.4 | 5.0 | 8.7 | 5.0 | 5.0 | 5.0 |
|  | HXA3922HP | — | — | — | — | — | — | — |
|  | FXR1030 | — | — | — | — | — | — | — |
|  | 2P4MZ | — | — | — | — | — | — | — |
| (D) component | KBM403 | — | 0.5 | 0.5 | 0.9 | — | 0.4 | 0.9 |
|  | KBM303 | — | — | — | — | — | — | — |
|  | KBM503 | — | — | — | — | — | — | — |
|  | KBM4803 | — | — | — | — | — | — | — |
| (D') component | KR41B | — | — | — | — | — | — | — |
|  | KR46B | — | — | — | — | — | — | — |
|  | KR55 | — | — | — | — | — | — | — |
| (E) component | TPB | — | — | — | — | — | — | — |
|  | ALA | — | — | — | — | — | — | — |
|  | Barbituric acid | — | — | — | — | — | — | — |
| (F) component | SOE5 | — | — | — | — | — | — | — |
|  | AO 809 | — | — | — | — | — | — | — |
| Total |  | 100 | 100 | 100 | 100 | 100 | 100 | 100 |
| Epoxy functional amount ((A) component) |  | 0.36 | 0.57 | 0.23 | 0.50 | 0.35 | 0.35 | 0.34 |
| Thiol functional amount ((B) component) |  | 0.40 | 0.00 | 0.63 | 0.13 | 0.32 | 0.32 | 0.31 |
| Thiol/epoxy equivalent ratio |  | 1.1 | 0.0 | 2.8 | 0.3 | 0.9 | 0.9 | 0.9 |
| Si functional group amount ((D) component) |  | 0.000 | 0.002 | 0.002 | 0.004 | 0.000 | 0.002 | 0.004 |
| Si/thiol equivalent ratio |  | 0.000 | 0.000 | 0.004 | 0.028 | 0.000 | 0.006 | 0.012 |
| (C) component/(A) component equivalent ratio (parts by mass/100 parts by mass) |  | 2.8 | 4.3 | 4.3 | 3.4 | 2.9 | 2.9 | 2.9 |
| (E) component/(A) component equivalent ratio (parts by mass/100 parts by mass) |  | — | — | — | — | — | — | — |
| Evaluation of shear strength after PCT test [kgf/chip] |  |  |  |  |  |  |  |  |
| Curing at 80° C. for 1 hr PCT time [hours] | 0 | 30.2 | 0.0 | 17.1 | 0.1 | 23.2 | 25.6 | 24.7 |
|  | 10 | 5.8 | — | 3.3 | — | 4.6 | 4.8 | 4.6 |
|  | 20 | 5.7 | — | 3.2 | — | 4.3 | 4.9 | 4.4 |
| Persistence of shear strength (%) | PCT 10 hours | 19.3 | — | 19.5 | — | 19.8 | 18.9 | 18.8 |
|  | PCT 20 hours | 18.9 | — | 19.0 | — | 18.4 | 19.2 | 17.7 |
| Curing at 120° C. for 1 hr PCT time [hours] | 0 | 30.2 | 0.0 | 18.3 | 6.1 | 23.4 | 26.0 | 25.5 |
|  | 10 | 5.8 | — | 3.4 | — | 4.6 | 4.8 | 4.9 |
|  | 20 | 5.7 | — | 3.5 | — | 4.3 | 4.8 | 4.6 |
| Persistence of shear strength (%) | PCT 10 hours | 19.3 | — | 18.7 | — | 19.7 | 18.5 | 19.0 |
|  | PCT 20 hours | 18.9 | — | 19.1 | — | 18.3 | 18.3 | 18.1 |

TABLE 4

| | | Comparative Example 1-8 | Comparative Example 1-9 | Comparative Example 1-10 | Comparative Example 1-11 | Comparative Example 1-12 | Comparative Example 1-13 | Comparative Example 1-14 |
|---|---|---|---|---|---|---|---|---|
| (A) component | EXA835LV | 42.9 | 51.7 | 45.3 | 51.7 | 45.3 | 51.7 | 45.3 |
| | YDF8170 | — | — | — | — | — | — | — |
| | ZX1658GS | — | — | — | — | — | — | — |
| (B) component | TS-G | — | 38.7 | 33.9 | 38.7 | 33.9 | 38.7 | 33.9 |
| (B') component | PEMP | 32.1 | — | — | — | — | — | — |
| (C) component | HX3088 | 3.9 | 4.8 | 4.2 | 4.8 | 4.2 | 4.8 | 4.2 |
| | HXA3922HP | — | — | — | — | — | — | — |
| | FXR1030 | — | — | — | — | — | — | — |
| | 2P4MZ | — | — | — | — | — | — | — |
| (D) component | KBM403 | 20.9 | — | — | — | — | — | — |
| | KBM303 | — | — | — | — | — | — | — |
| | KBM503 | — | — | — | — | — | — | — |
| | KBM4803 | — | — | — | — | — | — | — |
| (D') component | KR41B | — | 4.8 | 16.7 | — | — | — | — |
| | KR46B | — | — | — | 4.8 | 16.7 | — | — |
| | KR55 | — | — | — | — | — | 4.8 | 16.7 |
| (E) component | TPB | — | — | — | — | — | — | — |
| | ALA | — | — | — | — | — | — | — |
| | Barbituric acid | — | — | — | — | — | — | — |
| (F) component | SOE5 | — | — | — | — | — | — | — |
| | AO 809 | — | — | — | — | — | — | — |
| Total | | 100 | 100 | 100 | 100 | 100 | 100 | 100 |
| Epoxy functional amount ((A) component) | | 0.27 | 0.33 | 0.29 | 0.33 | 0.29 | 0.33 | 0.29 |
| Thiol functional amount ((B) component) | | 0.25 | 0.41 | 0.36 | 0.41 | 0.36 | 0.41 | 0.36 |
| Thiol/epoxy equivalent ratio | | 0.9 | 1.2 | 1.2 | 1.2 | 1.2 | 1.2 | 1.2 |
| Si functional group amount ((D) component) | | 0.089 | 0.000 | 0.000 | 0.000 | 0.000 | 0.000 | 0.000 |
| Si/thiol equivalent ratio | | 0.353 | 0.000 | 0.000 | 0.000 | 0.000 | 0.000 | 0.000 |
| (C) component/(A) component equivalent ratio (parts by mass/100 parts by mass) | | 2.9 | 2.9 | 2.9 | 2.9 | 2.9 | 2.9 | 2.9 |
| (E) component/(A) component equivalent ratio (parts by mass/100 parts by mass) | | — | — | — | — | — | — | — |
| Evaluation of shear strength after PCT test [kgf/chip] | | | | | | | | |
| Curing at 80° C. for 1 hr PCT time [hours] | 0 | 18.1 | 26.4 | 19.6 | 24.5 | 20.9 | 21.5 | 18.9 |
| | 10 | 3.4 | 5.0 | 3.4 | 3.4 | 4.0 | 4.0 | 3.6 |
| | 20 | 2.9 | 4.7 | 3.2 | 3.4 | 4.2 | 3.9 | 3.5 |
| Persistence of shear strength (%) | PCT 10 hours | 18.9 | 19.0 | 17.5 | 14.0 | 18.8 | 18.5 | 18.9 |
| | PCT 20 hours | 15.9 | 17.8 | 16.4 | 13.8 | 20.0 | 18.1 | 18.4 |
| Curing at 120° C. for 1 hr PCT time [hours] | 0 | 18.5 | 26.6 | 20.9 | 24.8 | 21.1 | 22.5 | 20.3 |
| | 10 | 3.3 | 4.9 | 3.8 | 3.5 | 4.2 | 4.0 | 3.8 |
| | 20 | 3.1 | 4.5 | 3.5 | 3.5 | 4.1 | 3.9 | 3.7 |
| Persistence of shear strength (%) | PCT 10 hours | 18.1 | 18.4 | 18.1 | 14.1 | 19.7 | 17.6 | 18.9 |
| | PCT 20 hours | 16.6 | 17.0 | 16.0 | 13.9 | 19.7 | 17.3 | 18.0 |

TABLE 5

| | | Comparative Example 1 | Example 2-1 | Example 2-2 | Example 2-3 | Example 2-4 | Example 2-5 | Example 2-6 | Example 2-7 |
|---|---|---|---|---|---|---|---|---|---|
| (A) component | EXA835LV | 57.0 | 54.2 | 54.0 | 53.8 | 52.0 | 46.2 | 42.9 | 40.2 |
| | YDF8170 | — | — | — | — | — | — | — | — |
| | ZX1658GS | — | — | — | — | — | — | — | — |
| (B) component | TS-G | 38.0 | 40.6 | 40.5 | 40.3 | 38.9 | 34.5 | 32.1 | 30.1 |
| (B') component | PEMP | — | — | — | — | — | — | — | — |
| (C) component | HX3088 | 5.0 | 5.0 | 5.0 | 5.0 | 4.8 | 4.3 | 3.9 | 3.7 |
| | HXA3922HP | — | — | — | — | — | — | — | — |
| | FXR1030 | — | — | — | — | — | — | — | — |
| | 2P4MZ | — | — | — | — | — | — | — | — |

TABLE 5-continued

|  |  | Comparative Example 1 | Example 2-1 | Example 2-2 | Example 2-3 | Example 2-4 | Example 2-5 | Example 2-6 | Example 2-7 |
|---|---|---|---|---|---|---|---|---|---|
| (D) component | KBM403 | — | 0.2 | 0.4 | 0.9 | 4.2 | 14.9 | 20.9 | 25.9 |
|  | KBM303 | — | — | — | — | — | — | — | — |
|  | KBM503 | — | — | — | — | — | — | — | — |
|  | KBM4803 | — | — | — | — | — | — | — | — |
| (D') component | KR41B | — | — | — | — | — | — | — | — |
|  | KR46B | — | — | — | — | — | — | — | — |
|  | KR55 | — | — | — | — | — | — | — | — |
| (E) component | TPB | — | — | — | — | — | — | — | — |
|  | ALA | — | — | — | — | — | — | — | — |
|  | Barbituric acid | — | — | — | — | — | — | — | — |
| (F) component | SOE5 | — | — | — | — | — | — | — | — |
|  | AO 809 | — | — | — | — | — | — | — | — |
| Total |  | 100 | 100 | 100 | 100 | 100 | 100 | 100 | 100 |
| Epoxy functional amount ((A) component) |  | 0.36 | 0.37 | 0.35 | 0.34 | 0.33 | 0.30 | 0.27 | 0.26 |
| Thiol functional amount ((B) component) |  | 0.40 | 0.43 | 0.43 | 0.43 | 0.41 | 0.37 | 0.34 | 0.32 |
| Thiol/epoxy equivalent ratio |  | 1.1 | 1.2 | 1.2 | 1.2 | 1.2 | 1.2 | 1.2 | 1.2 |
| Si functional group amount ((D) component) |  | 0.000 | 0.001 | 0.002 | 0.004 | 0.018 | 0.063 | 0.089 | 0.110 |
| Si/thiol equivalent ratio |  | 0.000 | 0.002 | 0.004 | 0.009 | 0.043 | 0.171 | 0.259 | 0.342 |
| (C) component/(A) component equivalent ratio (parts by mass/100 parts by mass) |  | 2.8 | 2.9 | 2.9 | 2.9 | 2.9 | 2.9 | 2.9 | 2.9 |
| (E) component/(A) component equivalent ratio (parts by mass/100 parts by mass) |  | — | — | — | — | — | — | — | — |
| Evaluation of shear strength after PCT test [kgf/chip] |  |  |  |  |  |  |  |  |  |
| Curing at 80° C. for 1 hr | 0 | 25.8 | 26.3 | 27.6 | 25.6 | 29.7 | 26.6 | 28.2 | 33.9 |
| PCT time [hours] | 10 | 3.6 | 8.6 | 14.4 | 14.9 | 18.1 | 24.3 | 25.5 | 22.6 |
|  | 20 | 4.2 | 8.0 | 9.5 | 13.4 | 17.3 | 22.4 | 25.7 | 20.0 |
| Persistence of shear strength (%) | PCT 10 hours | 13.8 | 32.6 | 52.1 | 58.1 | 60.9 | 91.4 | 90.6 | 66.5 |
|  | PCT 20 hours | 16.5 | 30.6 | 34.5 | 52.3 | 58.2 | 84.5 | 91.1 | 59.0 |
| Curing at 120° C. for 1 hr | 0 | 28.6 | 27.4 | 26.5 | 25.8 | 30.3 | 29.8 | 29.6 | 34.8 |
| PCT time [hours] | 10 | 5.9 | 9.0 | 10.4 | 14.5 | 19.2 | 25.1 | 26.7 | 22.3 |
|  | 20 | 5.4 | 8.2 | 9.9 | 13.2 | 17.5 | 22.8 | 26.6 | 20.7 |
| Persistence of shear strength (%) | PCT 10 hours | 20.6 | 32.8 | 39.1 | 56.2 | 63.5 | 84.0 | 90.2 | 84.2 |
|  | PCT 20 hours | 18.9 | 29.9 | 37.3 | 51.1 | 57.8 | 76.3 | 90.0 | 59.5 |

TABLE 6

|  |  | Example 2-8 | Example 2-9 | Example 2-10 | Example 2-11 | Example 2-12 | Comparative Example 2-1 | Comparative Example 2-2 | Example 2-13 |
|---|---|---|---|---|---|---|---|---|---|
| (A) component | EXA835LV | 37.7 | 35.6 | 33.6 | 31.9 | 27.1 | 21.7 | 16.2 | 54.2 |
|  | YDF8170 | — | — | — | — | — | — | — | — |
|  | ZX1658GS | — | — | — | — | — | — | — | — |
| (B) component | TS-G | 28.2 | 26.6 | 25.2 | 23.9 | 20.3 | 16.3 | 12.1 | 40.6 |
| (B') component | PEMP | — | — | — | — | — | — | — | — |
| (C) component | HX3088 | 3.5 | 3.3 | 3.1 | 2.9 | 2.5 | 2.0 | 1.5 | 5.0 |
|  | HXA3922HP | — | — | — | — | — | — | — | — |
|  | FXR1030 | — | — | — | — | — | — | — | — |
|  | 2P4MZ | — | — | — | — | — | — | — | — |
| (D) component | KBM403 | 30.5 | 34.4 | 38.0 | 41.2 | 50.0 | 60.0 | 70.1 | — |
|  | KBM303 | — | — | — | — | — | — | — | 0.2 |
|  | KBM503 | — | — | — | — | — | — | — | — |
|  | KBM4803 | — | — | — | — | — | — | — | — |
| (D') component | KR41B | — | — | — | — | — | — | — | — |
|  | KR46B | — | — | — | — | — | — | — | — |
|  | KR55 | — | — | — | — | — | — | — | — |
| (E) component | TPB | — | — | — | — | — | — | — | — |
|  | ALA | — | — | — | — | — | — | — | — |
|  | Barbituric acid | — | — | — | — | — | — | — | — |

TABLE 6-continued

|  |  | Example 2-8 | Example 2-9 | Example 2-10 | Example 2-11 | Example 2-12 | Comparative Example 2-1 | Comparative Example 2-2 | Example 2-13 |
|---|---|---|---|---|---|---|---|---|---|
| (F) component | SOE5 | — | — | — | — | — | — | — | — |
|  | AO 809 | — | — | — | — | — | — | — | — |
| Total |  | 100 | 100 | 100 | 100 | 100 | 100 | 100 | 100 |
| Epoxy functional amount ((A) component) |  | 0.24 | 0.23 | 0.22 | 0.20 | 0.17 | 0.14 | 0.10 | 0.35 |
| Thiol functional amount ((B) component) |  | 0.30 | 0.28 | 0.27 | 0.25 | 0.22 | 0.17 | 0.13 | 0.43 |
| Thiol/epoxy equivalent ratio |  | 1.2 | 1.2 | 1.2 | 1.2 | 1.2 | 1.2 | 1.2 | 1.2 |
| Si functional group amount ((D) component) |  | 0.129 | 0.146 | 0.161 | 0.174 | 0.211 | 0.254 | 0.3 | 0.001 |
| Si/thiol equivalent ratio |  | 0.430 | 0.514 | 0.600 | 0686 | 0.978 | 1.467 | 2.298 | 0.002 |
| (C) component/(A) component equivalent ratio (parts by mass/100 parts by mass) |  | 2.9 | 2.9 | 2.9 | 2.9 | 2.9 | 2.9 | 2.9 | 2.9 |
| (E) component/(A) component equivalent ratio (parts by mass/100 parts by mass) |  | — | — | — | — | — | — | — | — |
| Evaluation of shear strength after PCT test [kgf/chip] |  |  |  |  |  |  |  |  |  |
| Curing at 80° C. for 1 hr | 0 | 30.9 | 30.6 | 28.4 | 24.7 | 22.1 | 7.9 | 7.6 | 29.5 |
| PCT time [hours] | 10 | 22.0 | 23.8 | 25.0 | 24.2 | 14.4 | 7.5 | 7.5 | 18.3 |
|  | 20 | 21.9 | 21.5 | 24.2 | 22.6 | 13.7 | 7.2 | 7.8 | 17.2 |
| Persistence of shear strength (%) | PCT 10 hours | 71.2 | 77.7 | 88.1 | 98.1 | 65.1 | 94.6 | 98.3 | 62.2 |
|  | PCT 20 hours | 71.1 | 70.1 | 85.3 | 91.4 | 62.2 | 90.9 | 101.9 | 58.3 |
| Curing at 120° C. for 1 hr | 0 | 31.2 | 32.1 | 28.7 | 25.1 | 23.2 | 8.0 | 7.8 | 30.6 |
| PCT time [hours] | 10 | 21.8 | 26.0 | 26.3 | 24.4 | 15.8 | 7.6 | 7.8 | 18.6 |
|  | 20 | 21.4 | 23.5 | 23.7 | 23.1 | 15.1 | 7.3 | 7.6 | 17.0 |
| Persistence of shear strength (%) | PCT 10 hours | 70.0 | 81.0 | 91.7 | 97.4 | 67.9 | 94.1 | 99.2 | 60.7 |
|  | PCT 20 hours | 68.6 | 73.3 | 82.5 | 92.3 | 64.9 | 90.5 | 97.3 | 55.7 |

TABLE 7

|  |  | Example 2-14 | Example 2-15 | Example 2-16 | Example 2-17 | Example 2-18 | Example 2-19 | Example 2-20 |
|---|---|---|---|---|---|---|---|---|
| (A) component | EXA835LV | 54.0 | 53.8 | 52.0 | 46.2 | 54.2 | 54.0 | 53.6 |
|  | YDF8170 | — | — | — | — | — | — | — |
|  | ZX1658GS | — | — | — | — | — | — | — |
| (B) component | TS-G | 40.5 | 40.3 | 38.9 | 34.6 | 40.6 | 40.5 | 40.3 |
| (B') component | PEMP | — | — | — | — | — | — | — |
| (C) component | HX3088 | 5.0 | 5.0 | 4.8 | 4.3 | 5.0 | 5.0 | 5.0 |
|  | HXA3922HP | — | — | — | — | — | — | — |
|  | FXR1030 | — | — | — | — | — | — | — |
|  | 2P4MZ | — | — | — | — | — | — | — |
| (D) component | KBM403 | — | — | — | — | — | — | — |
|  | KBM303 | 0.4 | 0.9 | 4.2 | 14.9 | — | — | — |
|  | KBM503 | — | — | — | — | 0.2 | 0.4 | 0.9 |
|  | KBM4803 | — | — | — | — | — | — | — |
| (D') component | KR41B | — | — | — | — | — | — | — |
|  | KR46B | — | — | — | — | — | — | — |
|  | KR55 | — | — | — | — | — | — | — |
| (E) component | TPB | — | — | — | — | — | — | — |
|  | ALA | — | — | — | — | — | — | — |
|  | Barbituric acid | — | — | — | — | — | — | — |
| (F) component | SOE5 | — | — | — | — | — | — | — |
|  | AO 809 | — | — | — | — | — | — | — |
| Total |  | 100 | 100 | 100 | 100 | 100 | 100 | 100 |
| Epoxy functional amount ((A) component) |  | 0.35 | 0.34 | 0.33 | 0.30 | 0.35 | 0.35 | 0.34 |
| Thiol functional amount ((B) component) |  | 0.43 | 0.43 | 0.41 | 0.37 | 0.43 | 0.43 | 0.43 |
| Thiol/epoxy equivalent ratio |  | 1.2 | 1.2 | 1.2 | 1.2 | 1.2 | 1.2 | 1.2 |
| Si functional group amount ((D) component) |  | 0.002 | 0.004 | 0.017 | 0.060 | 0.001 | 0.002 | 0.004 |
| Si/thiol equivalent ratio |  | 0.004 | 0.008 | 0.041 | 0.164 | 0.002 | 0.004 | 0.008 |
| (C) component/(A) component equivalent ratio (parts by mass/100 parts by mass) |  | 2.9 | 2.9 | 2.9 | 2.9 | 2.9 | 2.9 | 2.9 |
| (E) component/(A) component equivalent ratio (parts by mass/100 parts by mass) |  | — | — | — | — | — | — | — |
| Evaluation of shear strength after PCT test [kgf/chip] |  |  |  |  |  |  |  |  |

TABLE 7-continued

|  |  | Example 2-14 | Example 2-15 | Example 2-16 | Example 2-17 | Example 2-18 | Example 2-19 | Example 2-20 |
| --- | --- | --- | --- | --- | --- | --- | --- | --- |
| Curing at 80° C. for 1 hr | 0 | 29.3 | 26.3 | 28.5 | 26.6 | 28.7 | 28.0 | 28.0 |
| PCT time [hours] | 10 | 18.2 | 14.7 | 20.4 | 24.9 | 9.6 | 10.4 | 12.9 |
|  | 20 | 17.6 | 14.3 | 18.1 | 22.1 | 9.1 | 10.1 | 11.1 |
| Persistence of shear strength | PCT 10 hours | 62.2 | 55.9 | 71.5 | 93.6 | 33.5 | 37.0 | 46.1 |
| (%) | PCT 20 hours | 60.2 | 54.2 | 63.5 | 83.4 | 31.7 | 35.9 | 39.5 |
| Curing at 120° C. for 1 hr | 0 | 29.5 | 27.8 | 29.1 | 27.4 | 29.4 | 30.1 | 29.0 |
| PCT time [hours] | 10 | 19.2 | 16.2 | 20.7 | 24.4 | 9.4 | 11.3 | 12.8 |
|  | 20 | 18.1 | 15.3 | 19.2 | 22.6 | 8.9 | 10.4 | 11.9 |
| Persistence of shear strength | PCT 10 hours | 65.1 | 58.2 | 71.0 | 89.3 | 32.0 | 37.7 | 44.3 |
| (%) | PCT 20 hours | 61.2 | 55.2 | 66.2 | 82.6 | 30.4 | 34.4 | 41.2 |

TABLE 8

|  |  | Example 2-21 | Example 2-22 | Example 2-23 | Example 2-24 | Example 2-25 |
| --- | --- | --- | --- | --- | --- | --- |
| (A) component | EXA835LV | 52.0 | 46.2 | 53.9 | 51.3 | 40.8 |
|  | YDF8170 | — | — | — | — | — |
|  | ZX1658GS | — | — | — | — | — |
| (B) component | TS-G | 38.9 | 34.6 | 40.4 | 38.4 | 30.5 |
| (B') component | PEMP | — | — | — | — | — |
| (C) component | HX3088 | 4.8 | 4.3 | 5.0 | 4.7 | 3.8 |
|  | HXA3922HP | — | — | — | — | — |
|  | FXR1030 | — | — | — | — | — |
|  | 2P4MZ | — | — | — | — | — |
| (D) component | KBM403 | — | — | — | — | — |
|  | KBM303 | — | — | — | — | — |
|  | KBM503 | 4.2 | 14.9 | — | — | — |
|  | KBM4803 | — | — | 0.6 | 5.4 | 24.8 |
| (D') component | KR41B | — | — | — | — | — |
|  | KR46B | — | — | — | — | — |
|  | KR55 | — | — | — | — | — |
| (E) component | TPB | — | — | — | — | — |
|  | ALA | — | — | — | — | — |
|  | Barbituric acid | — | — | — | — | — |
| (F) component | SOE5 | — | — | — | — | — |
|  | AO 809 | — | — | — | — | — |
| Total |  | 100 | 100 | 100 | 100 | 100 |
| Epoxy functional amount ((A) component) |  | 0.33 | 0.30 | 0.35 | 0.33 | 0.26 |
| Thiol functional amount ((B) component) |  | 0.41 | 0.37 | 0.43 | 0.41 | 0.32 |
| Thiol/epoxy equivalent ratio |  | 1.2 | 1.2 | 1.2 | 1.2 | 1.2 |
| Si functional group amount ((D) component) |  | 0.017 | 0.06 | 0.002 | 0.018 | 0.081 |
| Si/thiol equivalent ratio |  | 0.041 | 0.163 | 0.005 | 0.043 | 0.249 |
| (C) component/(A) component equivalent ratio (parts by mass/100 parts by mass) |  | 2.9 | 2.9 | 2.9 | 2.9 | 2.9 |
| (E) component/(A) component equivalent ratio (parts by mass/100 parts by mass) |  | — | — | — | — | — |
| Evaluation of shear strength after PCT test [kgf/chip] |  |  |  |  |  |  |
| Curing at 80° C. for 1 hr | 0 | 29.6 | 27.4 | 32.6 | 30.6 | 27.0 |
| PCT time [hours] | 10 | 16.2 | 20.8 | 11.1 | 14.5 | 16.8 |
|  | 20 | 14.6 | 17.5 | 10.0 | 14.7 | 15.0 |
| Persistence of shear strength | PCT 10 hours | 54.9 | 76.0 | 34.0 | 47.1 | 62.2 |
| (%) | PCT 20 hours | 49.4 | 63.8 | 30.7 | 48.1 | 55.5 |
| Curing at 120° C. for 1 hr | 0 | 29.8 | 27.8 | 33.4 | 32.6 | 28.6 |
| PCT time [hours] | 10 | 15.8 | 20.2 | 11.6 | 16.0 | 17.5 |
|  | 20 | 15.5 | 18.4 | 10.5 | 15.0 | 16.5 |
| Persistence of shear strength | PCT 10 hours | 53.1 | 72.7 | 34.6 | 49.0 | 61.0 |
| (%) | PCT 20 hours | 51.9 | 66.1 | 31.5 | 45.9 | 57.4 |

TABLE 9

|  |  | Example 3-1 | Example 3-2 | Example 3-3 | Example 3-4 | Example 3-5 | Example 3-6 |
| --- | --- | --- | --- | --- | --- | --- | --- |
| (A) component | EXA835LV | 54.0 | 46.2 | 56.9 | 48.6 | 56.9 | 48.6 |
|  | YDF8170 | — | — | — | — | — | — |
|  | ZX1658GS | — | — | — | — | — | — |

TABLE 9-continued

|  |  | Example 3-1 | Example 3-2 | Example 3-3 | Example 3-4 | Example 3-5 | Example 3-6 |
| --- | --- | --- | --- | --- | --- | --- | --- |
| (B) component | TS-G | 40.5 | 34.6 | 37.9 | 32.3 | 37.9 | 32.3 |
| (B') component | PEMP | — | — | — | — | — | — |
| (C) component | HX3088 | — | — | — | — | — | — |
|  | HXA3922HP | 5.0 | 4.3 | — | — | — | — |
|  | FXR1030 | — | — | 4.7 | 4.1 | — | — |
|  | 2P4MZ | — | — | — | — | 4.7 | 4.1 |
| (D) component | KBM403 | — | — | — | — | — | — |
|  | KBM303 | — | — | — | — | — | — |
|  | KBM503 | — | — | — | — | — | — |
|  | KBM4803 | — | — | — | — | — | — |
| (D') component | KR41B | — | — | — | — | — | — |
|  | KR46B | — | — | — | — | — | — |
|  | KR55 | — | — | — | — | — | — |
| (E) component | TPB | — | — | — | — | — | — |
|  | ALA | — | — | — | — | — | — |
|  | Barbituric acid | — | — | — | — | — | — |
| (F) component | SOE5 | — | — | — | — | — | — |
|  | AO 809 | — | — | — | — | — | — |
| Total |  | 100 | 100 | 100 | 100 | 100 | 100 |
| Epoxy functional amount ((A) component) |  | 0.35 | 0.30 | 0.34 | 0.29 | 0.34 | 0.29 |
| Thiol functional amount ((B) component) |  | 0.43 | 0.37 | 0.40 | 0.34 | 0.40 | 0.34 |
| Thiol/epoxy equivalent ratio |  | 1.2 | 1.2 | 1.2 | 1.2 | 1.2 | 1.2 |
| Si functional group amount ((D) component) |  | 0.002 | 0.0063 | 0.002 | 0.063 | 0.002 | 0.063 |
| Si/thiol equivalent ratio |  | 0.004 | 0.171 | 0.005 | 0.184 | 0.005 | 0.184 |
| (C) component/(A) component equivalent ratio (parts by mass/100 parts by mass) |  | 2.9 | 2.9 | 8.3 | 8.3 | 8.3 | 2.9 |
| (E) component/(A) component equivalent ratio (parts by mass/100 parts by mass) |  |  |  |  |  |  |  |
| Evaluation of shear strength after PCT test [kgf/chip] |  |  |  |  |  |  |  |
| Curing at 80° C. for 1 hr | 0 | 25.3 | 19.1 | 33.7 | 30.2 | 33.4 | 32.8 |
| PCT time [hours] | 10 | 11.6 | 18.9 | 20.4 | 20.2 | 18.3 | 25.0 |
|  | 20 | 8.0 | 18.2 | 18.9 | 21.1 | 17.8 | 25.3 |
| Persistence of shear strength (%) | PCT 10 hours | 46.0 | 99.0 | 60.7 | 67.1 | 54.7 | 76.1 |
|  | PCT 20 hours | 31.4 | 95.3 | 56.1 | 69.9 | 53.3 | 77.0 |
| Curing at 120° C. for 1 hr | 0 | 30.3 | 29.8 | 34.6 | 31.1 | 34.9 | 34.1 |
| PCT time [hours] | 10 | 16.4 | 28.0 | 21.4 | 21.6 | 19.7 | 27.1 |
|  | 20 | 15.1 | 26.4 | 19.7 | 20.9 | 18.1 | 25.6 |
| Persistence of shear strength (%) | PCT 10 hours | 54.3 | 94.0 | 61.9 | 69.4 | 56.5 | 79.5 |
|  | PCT 20 hours | 49.9 | 88.4 | 56.8 | 67.1 | 51.9 | 74.9 |

TABLE 10

|  |  | Comparative Example 3-1 | Comparative Example 3-2 | Comparative Example 3-3 |
| --- | --- | --- | --- | --- |
| (A) component | EXA835LV | 54.3 | 57.2 | 57.2 |
|  | YDF8170 | — | — | — |
|  | ZX1658GS | — | — | — |
| (B) component | TS-G | 40.7 | 38.1 | 38.1 |
| (B') component | PEMP | — | — | — |
| (C) component | HX3088 | — | — | — |
|  | HXA3922HP | 5.0 | — | — |
|  | FXR1030 | — | 4.8 | — |
|  | 2P4MZ | — | — | 4.7 |
| (D) component | KBM403 | — | — | — |
|  | KBM303 | — | — | — |
|  | KBM503 | — | — | — |
|  | KBM4803 | — | — | — |
| (D') component | KR41B | — | — | — |
|  | KR46B | — | — | — |
|  | KR55 | — | — | — |
| (E) component | TPB | — | — | — |
|  | ALA | — | — | — |
|  | Barbituric acid | — | — | — |
| (F) component | SOE5 | — | — | — |
|  | AO 809 | — | — | — |
| Total |  | 100 | 100 | 100 |
| Epoxy functional amount ((A) component) |  | 0.35 | 0.36 | 0.36 |
| Thiol functional amount ((B) component) |  | 0.43 | 0.41 | 0.41 |
| Thiol/epoxy equivalent ratio |  | 1.2 | 1.1 | 1.1 |
| Si functional group amount ((D) component) |  | 0.000 | 0.000 | 0.000 |

TABLE 10-continued

|  |  | Comparative Example 3-1 | Comparative Example 3-2 | Comparative Example 3-3 |
|---|---|---|---|---|
| Si/thiol equivalent ratio |  | 0.000 | 0.000 | 0.000 |
| (C) component/(A) component equivalent ratio (parts by mass/100 parts by mass) |  | 2.9 | 8.3 | 8.3 |
| (E) component/(A) component equivalent ratio (parts by mass/100 parts by mass) |  | — | — | — |
| Evaluation of shear strength after PCT test [kgf/chip] |  |  |  |  |
| Curing at 80° C. for 1 hr PCT time [hours] | 0 | 22.6 | 33.0 | 32.7 |
|  | 10 | 4.2 | 5.1 | 4.6 |
|  | 20 | 4.1 | 4.7 | 4.5 |
| Persistence of shear strength (%) | PCT 10 hours | 18.4 | 15.5 | 14.0 |
|  | PCT 20 hours | 18.2 | 14.3 | 13.6 |
| Curing at 120° C. for 1 hr PCT time [hours] | 0 | 28.8 | 33.9 | 34.2 |
|  | 10 | 4.9 | 5.4 | 4.9 |
|  | 20 | 4.5 | 4.9 | 4.5 |
| Persistence of shear strength (%) | PCT 10 hours | 17.1 | 15.8 | 14.4 |
|  | PCT 20 hours | 15.8 | 14.5 | 13.2 |

TABLE 11

|  |  | Example 4-1 | Example 4-2 | Example 4-3 | Example 4-4 | Example 4-5 | Example 4-6 |
|---|---|---|---|---|---|---|---|
| (A) component | EXA835LV | 33.8 | 28.9 | 8.1 | 33.8 | 28.9 | 8.1 |
|  | YDF8170 | — | — | — | — | — | — |
|  | ZX1658GS | — | — | — | — | — | — |
| (B) component | TS-G | 25.3 | 21.6 | 6.1 | 25.3 | 21.6 | 6.1 |
| (B') component | PEMP | — | — | — | — | — | — |
| (C) component | HX3088 | 3.1 | 2.7 | 0.8 | 3.1 | 2.7 | 0.8 |
|  | HXA3922HP | — | — | — | — | — | — |
|  | FXR1030 | — | — | — | — | — | — |
|  | 2P4MZ | — | — | — | — | — | — |
| (D) component | KBM403 | 0.3 | 9.3 | 10.0 | 0.3 | 9.3 | 10.0 |
|  | KBM303 | — | — | — | — | — | — |
|  | KBM503 | — | — | — | — | — | — |
|  | KBM4803 | — | — | — | — | — | — |
| (D') component | KR41B | — | — | — | — | — | — |
|  | KR46B | — | — | — | — | — | — |
|  | KR55 | — | — | — | — | — | — |
| (E) component | TPB | — | — | — | — | — | — |
|  | ALA | — | — | — | — | — | — |
|  | Barbituric acid | — | — | — | — | — | — |
| (F) component | SOE5 | 37.5 | 37.5 | 75.0 | — | — | — |
|  | AO 809 | — | — | — | 37.5 | 37.5 | 75.0 |
| Total |  | 100 | 100 | 100 | 100 | 100 | 100 |
| Epoxy functional amount ((A) component) |  | 0.22 | 0.18 | 0.05 | 0.22 | 0.18 | 0.05 |
| Thiol functional amount ((B) component) |  | 0.27 | 0.23 | 0.06 | 0.27 | 0.23 | 0.06 |
| Thiol/epoxy equivalent ratio |  | 1.2 | 1.2 | 1.2 | 1.2 | 1.2 | 1.2 |
| Si functional group amount ((D) component) |  | 0.001 | 0.039 | 0.042 | 0.001 | 0.039 | 0.042 |
| Si/thiol equivalent ratio |  | 0.004 | 0.171 | 0.652 | 0.004 | 0.171 | 0.652 |
| (C) component/(A) component equivalent ratio (parts by mass/100 parts by mass) |  | 2.9 | 2.9 | 2.9 | 2.9 | 2.9 | 2.9 |
| (E) component/(A) component equivalent ratio (parts by mass/100 parts by mass) |  | — | — | — | — | — | — |
| Evaluation of shear strength after PCT test [kgf/chip] |  |  |  |  |  |  |  |
| Curing at 80° C. for 1 hr PCT time [hours] | 0 | 30.8 | 34.0 | 26.6 | 29.0 | 32.5 | 25.3 |
|  | 10 | 18.5 | 33.4 | 26.7 | 16.3 | 30.8 | 24.6 |
|  | 20 | 18.3 | 30.2 | 24.1 | 16.8 | 27.3 | 21.8 |

TABLE 11-continued

|  |  | Example 4-1 | Example 4-2 | Example 4-3 | Example 4-4 | Example 4-5 | Example 4-6 |
|---|---|---|---|---|---|---|---|
| Persistence of shear strength (%) | PCT 10 hours | 60.1 | 98.1 | 100.7 | 56.4 | 94.6 | 97.1 |
|  | PCT 20 hours | 59.5 | 88.6 | 90.9 | 58.1 | 83.9 | 86.1 |
| Curing at 120° C. for 1 hr PCT time [hours] | 0 | 31.5 | 34.8 | 27.2 | 30.4 | 33.7 | 26.3 |
|  | 10 | 18.1 | 32.8 | 26.2 | 18.0 | 32.3 | 25.8 |
|  | 20 | 18.0 | 30.9 | 24.7 | 17.9 | 29.7 | 23.7 |
| Persistence of shear strength (%) | PCT 10 hours | 57.5 | 94.0 | 96.5 | 59.3 | 95.6 | 98.0 |
|  | PCT 20 hours | 57.1 | 88.6 | 90.9 | 58.8 | 87.9 | 90.2 |

TABLE 12

|  |  | Example 5-1 | Example 5-2 | Example 5-3 |
|---|---|---|---|---|
| (A) component | EXA835LV | 56.1 | 54.0 | 55.5 |
|  | YDF8170 | — | — | — |
|  | ZX1658GS | — | — | — |
| (B) component | TS-G | 37.5 | 36.0 | 37.1 |
| (B') component | PEMP | — | — | — |
| (C) component | HX3088 | 5.0 | 4.8 | 4.9 |
|  | HXA3922HP | — | — | — |
|  | FXR1030 | — | — | — |
|  | 2P4MZ | — | — | — |
| (D) component | KBM403 | 0.5 | 0.5 | 0.5 |
|  | KBM303 | — | — | — |
|  | KBM503 | — | — | — |
|  | KBM4803 | — | — | — |
| (D') component | KR41B | — | — | — |
|  | KR46B | — | — | — |
|  | KR55 | — | — | — |
| (E) component | TPB | 1.0 | — | — |
|  | ALA | — | 4.8 | — |
|  | Barbituric acid | — | — | 2.0 |
| (F) component | SOE5 | — | — | — |
|  | AO 809 | — | — | — |
| Total |  | 100 | 100 | 100 |
| Epoxy functional amount ((A) component) |  | 0.36 | 0.34 | 0.35 |
| Thiol functional amount ((B) component) |  | 0.40 | 0.38 | 0.39 |
| Thiol/epoxy equivalent ratio |  | 1.1 | 1.1 | 1.1 |
| Si functional group amount ((D) component) |  | 0.002 | 0.002 | 0.002 |
| Si/thiol equivalent ratio |  | 0.005 | 0.005 | 0.005 |
| (C) component/(A) component equivalent ratio (parts by mass/100 parts by mass) |  | 2.8 | 2.8 | 2.8 |
| (E) component/(A) component equivalent ratio (parts by mass/100 parts by mass) |  | 1.8 | 8.8 | 3.5 |
| Evaluation of shear strength after PCT test [kgf/chip] |  |  |  |  |
| Curing at 80° C. for 1 hr PCT time [hours] | 0 | 25.6 | 18.2 | 16.4 |
|  | 10 | 13.4 | 12.3 | 11.0 |
|  | 20 | 11.4 | 9.6 | 10.2 |
| Persistence of shear strength (%) | PCT 10 hours | 52.3 | 67.6 | 67.1 |
|  | PCT 20 hours | 44.5 | 52.7 | 62.2 |
| Curing at 120° C. for 1 hr PCT time [hours] | 0 | 26.2 | 20.6 | 19.7 |
|  | 10 | 15.5 | 12.1 | 13.0 |
|  | 20 | 13.7 | 10.4 | 11.7 |
| Persistence of shear strength (%) | PCT 10 hours | 59.2 | 58.7 | 66.0 |
|  | PCT 20 hours | 52.3 | 50.5 | 59.4 |

Examples 1-1 to 1-5 are examples in which the equivalent ratio (thiol/epoxy equivalent ratio) between epoxy groups in the epoxy resin of the (A) component and thiol groups in the compound of the (B) component was changed within a range of 1:0.5 to 1:2.5. Examples 1-6 to 1-8 are examples in which the formulation amount of the curing accelerator of the (C) component was changed. Examples 1-9 to 1-10 are examples in which the epoxy resin of the (A) component was changed. In any of these examples, its adhesive strength (shear strength, thermal curing at 80° C. for 60 min or thermal curing at 120° C. for 60 min) was 9 Kgf/chip or more. Also, its persistence of the adhesive strength before and after the PCT (shear strength, curing at 80° C. for 60 min, at 120° C. for 60 min) was 30% or more.

In Comparative Example 1-1 in which the silane coupling agent of the (D) component was not formulated, its persistence of the adhesive strength before and after the PCT (shear strength, curing at 80° C. for 60 min, at 120° C. for 60 min) was less than 30%. In Comparative Example 1-2 in which the compound of the (B) component was not formulated, a sample did not adhere. In Comparative Example 1-3 in which the content of the compound of the (B) component in terms of an equivalent ratio between epoxy groups in the epoxy resin of the (A) component and thiol groups in the compound of the (B) component was more than 1:2.5, its persistence of the adhesive strength before and after the PCT (shear strength, curing at 80° C. for 60 min, at 120° C. for 60 min) was less than 30%. In Comparative Example 1-4 in which the content of the compound of the (B) component in terms of an equivalent ratio between epoxy groups in the epoxy resin of the (A) component and thiol groups in the compound of the (B) component was less than 1:0.5, its adhesive strength (shear strength, thermal curing at 80° C. for 60 min or thermal curing at 120° C. for 60 min) was as low as less than 9 Kgf/chip.

In any of Comparative Examples 1-5 to 1-8 in which a thiol compound having an ester bond was formulated as a (B)'component instead of the compound of the (B) component, its persistence of the adhesive strength before and after the PCT (shear strength, curing at 80° C. for 60 min, at 120° C. for 60 min) was less than 30%.

In any of Comparative Examples 1-9 to 1-14 in which a titanium coupling agent was formulated as a (D)'component instead of the silane coupling agent of the (D) component, its persistence of the adhesive strength before and after the PCT (shear strength, curing at 80° C. for 60 min, at 120° C. for 60 min) was less than 30%.

Examples 2-1 to 2-12 are examples in which the formulation amount of the silane coupling agent of the (D) component was changed. In any of these examples, its adhesive strength (shear strength, thermal curing at 80° C. for 60 min or thermal curing at 120° C. for 60 min) was 9 Kgf/chip or more. Also, its persistence of the adhesive strength before and after the PCT (shear strength, curing at 80° C. for 60 min, at 120° C. for 60 min) was 30% or more. In these examples, it was confirmed that the persistence of the adhesive strength before and after the PCT (shear strength, curing at 80° C. for 60 min, at 120° C. for 60 min) improves depending on the formulation amount of the silane coupling agent of the (D) component. Examples 2-13 to 2-17, Examples 2-18 to 2-22, and Examples 2-23 to 2-25 are examples in which the silane coupling agent of the (D) component was changed. In these examples, it was also confirmed that the persistence of the adhesive strength before and after the PCT (shear strength, curing at 80° C. for 60 min, at 120° C. for 60 min) improves depending on the formulation amount of the silane coupling agent of the (D) component. However, in any of Comparative Examples 2-1 to 2-2 in which the content of the silane coupling agent of the (D) component with respect to 100 parts by mass in total of the (A) component to the (D) component was more than 50 parts by mass, its adhesive strength (shear strength, thermal curing at 80° C. for 60 min or thermal curing at 120° C. for 60 min) was as low as less than 9 Kgf/chip. The persistence of the adhesive strength before and after the PCT (shear strength, curing at 80° C. for 60 min, at 120° C. for 60 min) decreased. Examples 3-1 to 3-6 are examples in which the curing accelerator of the (C) component was changed. In any of these examples, its adhesive strength (shear strength, thermal curing at 80° C. for 60 min or thermal curing at 120° C. for 60 min) was 9 Kgf/chip or more. Also, its persistence of the adhesive strength before and after the PCT (shear strength, curing at 80° C. for 60 min, at 120° C. for 60 min) was 30% or more.

In any of Comparative Examples 3-1 to 3-3 in which the silane coupling agent of the (D) component was not formulated, its persistence of the adhesive strength before and after the PCT (shear strength, curing at 80° C. for 60 min, at 120° C. for 60 min) was less than 30%. Examples 4-1 to 4-6 are examples in which a filler was further formulated as the (F) component. In any of these examples, its adhesive strength (shear strength, thermal curing at 80° C. for 60 min or thermal curing at 120° C. for 60 min) was 9 Kgf/chip or more. Also, its persistence of the adhesive strength before and after the PCT (shear strength, curing at 80° C. for 60 min, at 120° C. for 60 min) was 30% or more.

Examples 5-1 to 5-3 are examples in which a stabilizer was further formulated as the (E) component. In any of these examples, its adhesive strength (shear strength, thermal curing at 80° C. for 60 min or thermal curing at 120° C. for 60 min) was 9 Kgf/chip or more. Also, its persistence of the adhesive strength before and after the PCT (shear strength, curing at 80° C. for 60 min, at 120° C. for 60 min) was 30% or more.

The invention claimed is:

1. A resin composition, comprising:
   (A) an epoxy resin;
   (B) a compound represented by formula (1) below;

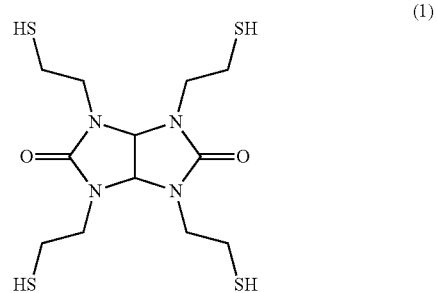 [SMILES: O=C1N(CCS)C2C(N1CCS)N(CCS)C(=O)N2CCS]

(C) a curing accelerator; and
   (D) a silane coupling agent, wherein
   a content of the compound of the (B) component is 1:0.5 to 1:2.5, in terms of an equivalent ratio between epoxy groups in the epoxy resin of the (A) component and thiol groups in the compound of the (B) component,
   a content of the silane coupling agent of the (D) component is 1 part by mass to 50 parts by mass with respect to 100 parts by mass of the (A) component, the (B) component, the (C) component, and the (D) component in total, and
   an equivalent ratio between thiol groups in the compound of the (B) component and Si in the silane coupling agent of the (D) component is 1:0.002 to 1:1.

2. The resin composition according to claim 1, further comprising (E) a stabilizer.

3. The resin composition according to claim 2, wherein the stabilizer of the (E) component is at least one selected from the group consisting of liquid boric acid ester compounds, aluminum chelate, and barbituric acids.

4. The resin composition according to claim 1, wherein the silane coupling agent of the (D) component is at least one selected from the group consisting of 3-glycidoxypropyltrimethoxysilane, 2-(3,4-epoxycyclohexyl)ethyltrimethoxysilane, 3-methacryloxypropyltrimethoxysilane, and 8-glycidoxyoctyltrimethoxysilane.

5. The resin composition according to claim 1, wherein the curing accelerator of the (C) component is an imidazole-based curing accelerator, a tertiary amine-based curing accelerator, or a phosphorus compound-based curing accelerator.

6. A one-component adhesive containing the resin composition according to claim 1.

7. A cured resin obtained by heating the resin composition according to claim 1.

8. An image sensor module manufactured with the one-component adhesive according to claim 6.

9. An electronic component manufactured with the one-component adhesive according to claim 6.

10. The resin composition according to claim 2, wherein the silane coupling agent of the (D) component is at least one selected from the group consisting of 3-glycidoxypropyltrimethoxysilane, 2-(3,4-epoxycyclohexyl)ethyltrimethoxysilane, 3-methacryloxypropyltrimethoxysilane, and 8-glycidoxyoctyltrimethoxysilane.

11. The resin composition according to claim 3, wherein the silane coupling agent of the (D) component is at least one selected from the group consisting of 3-glycidoxypropyltrimethoxysilane, 2-(3,4-epoxycyclohexyl)ethyltrimethoxysilane, 3-methacryloxypropyltrimethoxysilane, and 8-glycidoxyoctyltrimethoxysilane.

12. The resin composition according to claim 2, wherein the curing accelerator of the (C) component is an imidazole-based curing accelerator, a tertiary amine-based curing accelerator, or a phosphorus compound-based curing accelerator.

13. The resin composition according to claim 3, wherein the curing accelerator of the (C) component is an imidazole-based curing accelerator, a tertiary amine-based curing accelerator, or a phosphorus compound-based curing accelerator.

14. A one-component adhesive containing the resin composition according to claim 2.

15. A one-component adhesive containing the resin composition according to claim 3.

16. A cured resin obtained by heating the resin composition according to claim 2.

17. A cured resin obtained by heating the resin composition according to claim 3.

18. An image sensor module manufactured with the one-component adhesive according to claim 14.

19. An electronic component manufactured with the one-component adhesive according to claim 16.

20. The resin composition according to claim 1, wherein a content of the silane coupling agent of the (D) component is 4.2 parts by mass to 50 parts by mass with respect to 100 parts by mass of the (A) component, the (B) component, the (C) component, and the (D) component in total.

* * * * *